United States Patent
Park

(10) Patent No.: US 8,229,583 B2
(45) Date of Patent: Jul. 24, 2012

(54) APPARATUS AND METHOD OF SETTING RECEIVED BROADCASTING SOUND SOURCE DATA AS FUNCTIONAL SOUND OF MOBILE PHONE

(75) Inventor: Hong-joon Park, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1025 days.

(21) Appl. No.: 11/527,491

(22) Filed: Sep. 27, 2006

(65) Prior Publication Data

US 2007/0099587 A1 May 3, 2007

(30) Foreign Application Priority Data

Oct. 27, 2005 (KR) .................. 10-2005-0101964

(51) Int. Cl.
*G06F 17/00* (2006.01)
*H04H 40/00* (2008.01)
(52) U.S. Cl. .......................... 700/94; 455/3.06
(58) Field of Classification Search ............ 700/94; 455/3.06, 186.1; 381/56, 58, 77, 104–110
See application file for complete search history.

(56) References Cited

U.S. PATENT DOCUMENTS

| 6,335,730 | B1 * | 1/2002 | Gould ........................... 715/784 |
| 2005/0169114 | A1 * | 8/2005 | Ahn .................................. 369/7 |
| 2006/0109102 | A1 * | 5/2006 | Gortz et al. ................... 340/531 |
| 2008/0153555 | A1 * | 6/2008 | Aoike .......................... 455/567 |

FOREIGN PATENT DOCUMENTS

| CN | 1633690 A | 6/2005 |
| CN | 1665243 A | 9/2005 |
| JP | 2004-336481 A | 11/2004 |
| KR | 10-2005-0006118 A | 1/2005 |
| KR | 10-2005-0051011 A | 6/2005 |

\* cited by examiner

*Primary Examiner* — Andrew C Flanders
(74) *Attorney, Agent, or Firm* — Sughrue Mion, PLLC

(57) ABSTRACT

An apparatus and method of setting received broadcasting sound source data as a functional sound of a broadcast data receiving apparatus. The method includes receiving and decoding broadcasting data; storing sound source data included in the decoded broadcasting data in a storage unit; setting the stored sound source data as a functional sound configured to be output if a function of the broadcast data receiving apparatus is executed; and outputting the functional sound if the function is executed.

16 Claims, 7 Drawing Sheets

APPARATUS AND METHOD OF SETTING RECEIVED BROADCASTING SOUND SOURCE DATA AS FUNCTIONAL SOUND OF MOBILE PHONE

CROSS-REFERENCE TO RELATED APPLICATION

This application claims priority from Korean Patent Application No. 10-2005-0101964 filed on Oct. 27, 2005 in the Korean Intellectual Property Office, the disclosure of which is incorporated herein by reference in its entirety.

BACKGROUND OF THE INVENTION

1. Field of the Invention

The present invention relates to a digital media broadcasting/digital audio broadcasting (DMB/DAB) mobile phone, and more particularly, to an apparatus and method of setting received broadcasting sound source data as a functional sound of a mobile phone.

2. Description of the Related Art

A related art mobile phone supplies various functions used to perform communication as well as a function of enabling the communication. Accordingly, demands for the mobile phone have been increased. In order to set various functional sounds of the mobile phone, the mobile phone has a function to download sound source data through a network or store a desired sound source so as to store the sound source data or the desired sound source as a ring tone or an alarm of the mobile phone. Business models have been suggested based on a method of downloading a ring tone or an alarm.

FIG. 1 is a flowchart showing related art processes of receiving and storing sound sources of the FM radio as a ring tone performed by a mobile phone disclosed in Korean Unexamined Patent Application (KUPA) Publication No. 2005-0051011. A mobile phone receives a sound source of FM radio (S10). Generally, it is possible to receive the sound source of the FM radio if the mobile phone includes a module that receives FM radio frequency. The received sound source is converted to a digital signal (S20). Since the sound source of the FM radio is analog, the sound source of the FM radio is A/D (Analog to Digital) converted and stored as digital sound source data. The converted digital signal is stored in the mobile phone (S30), and the stored digital signal is set as ring tone (S40).

As another related art method, FIG. 2 shows a method of setting a ring tone by using a function of recording of a mobile phone disclosed in KUPA 2004-0037528. A user records arbitrary contents (S50). The contents recorded by the user are converted to a ring tone file (S60). The ring tone file is stored in a bell folder (S70). The user sets the ring tone file as a desired ring tone in the bell folder (S80). With these processes, the user sets the recorded sound (i.e., contents) as the ring tone. By using the recording function, the user can record the sound being output and use the sound as the ring tone without receiving the recorded sound source data from other devices.

However, in the above-described related art methods, the analog sound source data should be converted to the digital sound source data. While receiving the sound source of the FM radio, music is played, and if the user wants to set the music as a ring tone, the user should press a specific key. However, the user can store the music after a period of time has elapsed. That is, it is difficult for the user to record the sound source data from a desired point of time and convert the sound source data to digital data so as to store the converted digital data as the ring tone.

Recently, DMB and DAB have been applied to the mobile phone such that the user can use various sound source data by using the mobile phone. Further, the user increasingly demands to store the sound source data in the mobile phone so as to use various functions.

Accordingly, there is an unmet need for a method of setting music as a ring tone from portion thereof, even though the user tries to set the ring tone after the music has been played for a period of time.

SUMMARY OF THE INVENTION

The present invention provides an apparatus and method which set sound source data of DMB or DAB data as sound source data that is output when a function of a mobile phone is executed.

The present invention also provides an apparatus and method which set sound source data broadcasted beforehand as a functional sound of a mobile phone when setting sound source data while being broadcasted.

According to an aspect of the present invention, there is provided a method of setting received broadcasting sound source data as a functional sound of a broadcast data receiving apparatus, the method including receiving and decoding broadcasting data; storing sound source data included in the decoded broadcasting data in a storage unit; setting the stored source data as a functional sound that is output when a function of the broadcast data receiving apparatus is executed; and outputting the functional sound when the function is executed.

According to another aspect of the present invention, there is provided a method of setting received broadcasting sound source data as a functional sound of a broadcast data receiving apparatus, the method including receiving broadcasting data; storing sound source data of the received broadcasting data in a storage unit; decoding the stored sound source data and setting the decoded sound source data as a functional sound that is output when a function of the broadcast data receiving apparatus is executed; and outputting the functional sound when the function of the broadcast data receiving apparatus is executed.

According to still another aspect of the present invention, there is provided an apparatus setting received broadcasting sound source data as a functional sound of a broadcast data receiving apparatus, the apparatus including a broadcast-receiving unit receiving broadcasting data; a storage unit storing sound source data of the received broadcasting data; a selection unit selecting a portion from the stored sound source data; a functional sound setting unit setting the sound source data included in the portion as a functional sound that is output when a function of the broadcast data receiving apparatus is executed; and an output unit outputting the functional sound when the function of the broadcast data receiving apparatus is executed.

BRIEF DESCRIPTION OF THE DRAWINGS

The above and other aspects of the present invention will become more apparent by describing in detail exemplary embodiments thereof with reference to the attached drawings, in which.

DETAILED DESCRIPTION OF THE EXEMPLARY EMBODIMENTS

Figure 1:
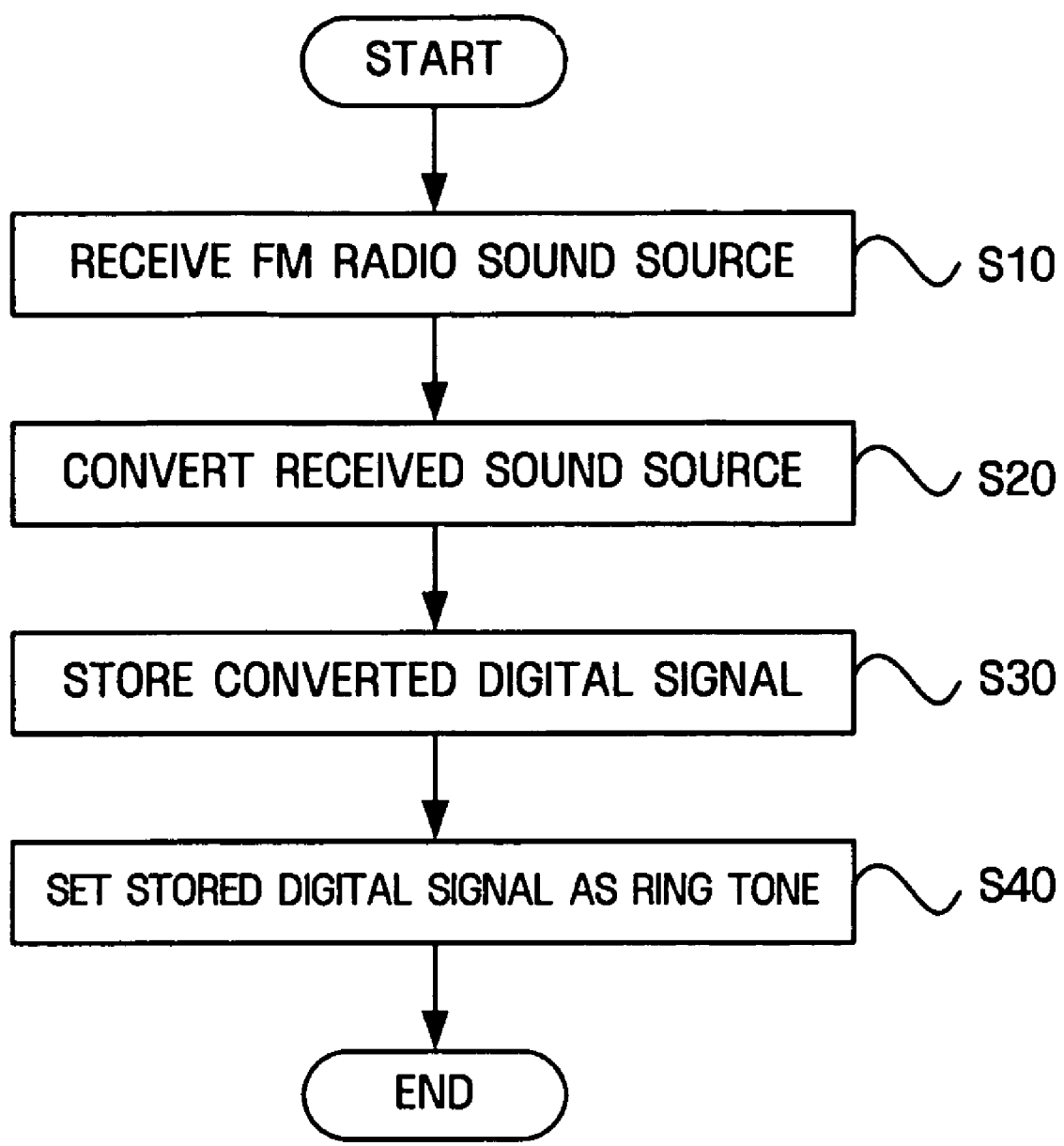
FIG. 1 is a flowchart showing related art processes of receiving and storing sound sources of FM radio as a ring tone performed by a mobile phone.
Figure 2:
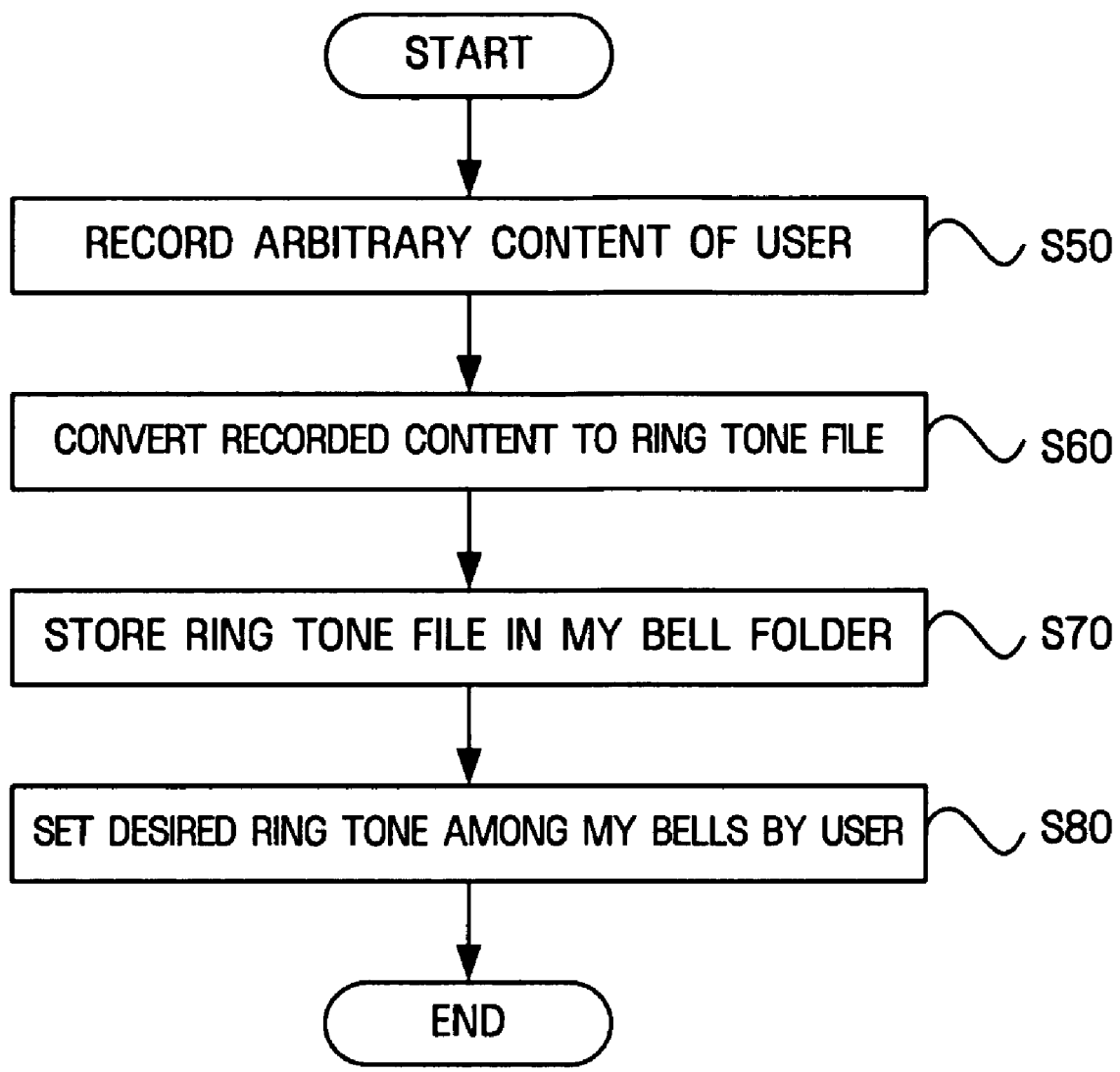
FIG. 2 is a flowchart showing related art processes of storing a ring tone by using a recording function included in a mobile phone.

Aspects and features of the present invention and methods of accomplishing the same may be understood more readily by reference to the following detailed description of exemplary embodiments and the accompanying drawings. The present invention may, however, be embodied in many different forms and should not be construed as being limited to the exemplary embodiments set forth herein. Rather, these exemplary embodiments are provided so that this disclosure will be thorough and complete and will fully convey the concept of the present invention to those skilled in the art, and the present invention will only be defined by the appended claims. Like reference numerals refer to like elements throughout the specification.

Hereinafter, a method and apparatus that sets sound source data of DMB/DAB to a functional sound of a mobile phone will be described according to exemplary embodiments of the present invention by referring to the drawings of block diagrams and a flowchart. It can be understood that each of blocks of the flowchart and combination of the flowchart can be executed by using computer program instructions. Since the computer program instructions can be included in a processor of a general computer, a special-purpose computer, or a programmable data processing device, the instructions executed by the processors of the computer or another programmable data processing device may create a unit that executes functions described in the block of the flowchart.

These computer program instructions can be stored in a computer usable memory or computer readable memory that can aim at a computer or another programmable data processing device so as to implement the computer program instruction in a specific manner. The instructions stored in the computer usable memory or the computer readable memory can produce manufacture items including the instruction units that execute the functions described in the blocks in the block of the flowchart. Since the computer program instructions can be included in a computer or another programmable data processing device, the instructions that create a process in which a series of operation stages are performed on the computer or another programmable data processing device and executed by a computer and causes the computer or another programmable data processing device to be performed can supply procedures so as to execute the functions described in the blocks of the flowchart.

Further, each block can represent a module, a segment, or a part of codes that includes one and more executable instructions for executing specific logic functions. In addition, in some modified embodiments, it should be understood that the function described in the blocks can be executed in disorder. For example, adjacent two blocks can be substantially performed at the same time or can be performed in reverse order in accordance with a function corresponding to the block.

Terms used in this specification are described as follows.

DMB, DAB

DMB and DAB stand for digital multimedia broadcasting and digital audio broadcasting, respectively. The Korean Broadcasting Commission defined DMB as digital multimedia broadcasting that can service sound quality, data, or image at the same level as a compact disc (CD) and supply fixed or moving receiving quality at a comprehensive plan for digital broadcasting such as digital multimedia center (DMC), data broadcasting, and DMB, published in February, 2003. The DMB is divided into terrestrial DMB and satellite DMB according to a terrestrial or satellite transmission unit. The properties of the DMB and DAB are 'multi-channels', 'multimedia', and 'mobility'. In this specification, the DMB includes the digital multimedia broadcasting.

Functional Sound

The functional sound is a voice or sound that is output when a mobile phone executes a specific function. The functional sound can include a ring tone when the mobile phone receives a call and a bell ring, alarm when a time is set, and an short message service (SMS) alert sound that rings when the SMS arrives.

Mobile Phone

The mobile phone is a portable communication device used for performing the communication and capable of receiving the DMB/DAB broadcasting. The mobile phone includes devices that supply communication function of the mobile phone such as a PDA. Therefore, the mobile phone includes devices that can receive the broadcasting and supply the communication function.

The exemplary embodiment is described with respect to a DMB phone that receives the DMB broadcasting data. However, the exemplary embodiment can be applied to a device such as the DAB that receives an audio broadcasting system.

Figure 3:
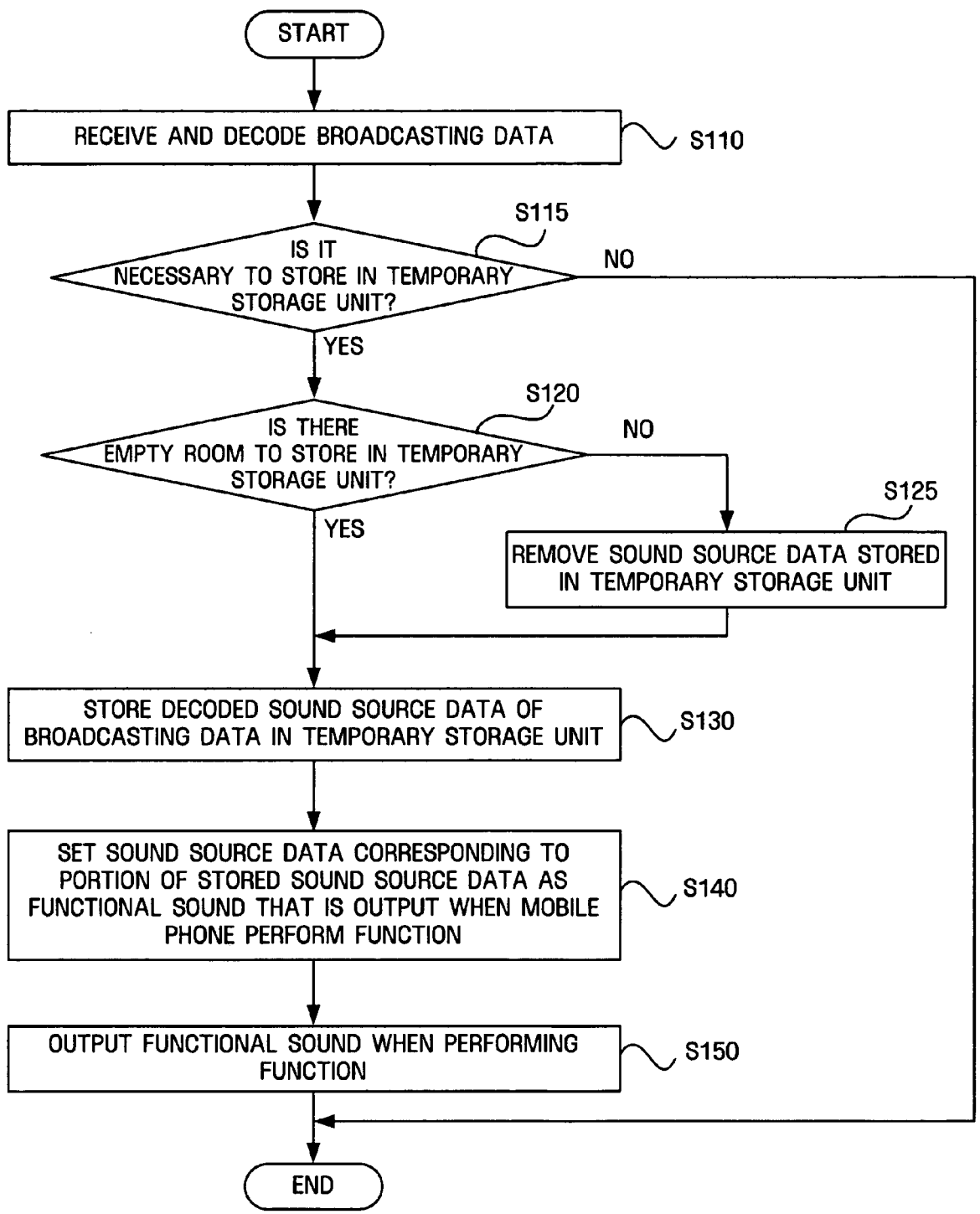
FIG. 3 is a flowchart showing processes of receiving and setting broadcasting data as a functional sound of the mobile phone according to an exemplary embodiment of the present invention.

FIG. 3 is a flowchart showing processes of receiving and setting broadcasting data as a functional sound of the mobile phone according to an exemplary embodiment of the present invention. A broadcasting receiver that is mounted inside or outside the mobile phone receives and decodes the broadcasting data (S110). The broadcasting data includes sound source data and data related to a broadcasting signal. Accordingly, the sound source data included in the received broadcasting data needs to be decoded. On the other hand, when the sound source data is compressed and encoded; the encoded sound source data should be output after being decoded. Accordingly, a process of providing the sound source data may be additionally performed.

Before storing the sound source data in a temporary storage unit, set information should be checked to determine whether it is necessary to store the broadcasting data in the temporary storage unit (S115). This determination may affect the performance of the mobile phone and power supply to buffer and maintain the broadcasting data received during a period of time. Therefore, the user can determine whether or not to buffer and maintain the broadcasting data received.

The temporary storage unit is checked if it has an empty room to store the broadcasting data (S120). If the temporary storage unit does not have an empty room to store the broadcasting data, sound source data stored beforehand is removed (S125). The sound source data to be removed can be selected according to various policies. The policies may be exemplified by a first-in first-out (FIFO) algorithm in which first stored data is first removed or another algorithm in which data having the lowest priority is removed when a user sets the priority with respect to the sound source data. However, any algorithm as would be understood by one skilled in the art may be substituted for a FIFO algorithm without departing from the scope of the invention.

When the temporary storage unit has an empty room or acquires an empty room by removing another sound source data, the sound source data of the decoded broadcasting data is stored in the temporary storage unit (S130). The stored sound source data remains in the temporary storage unit during a period of time. When the user wants to set music or sound as a functional sound of the mobile phone while listening to the broadcasting, the user sets the corresponding music or sound as the functional sound (S140).

At this moment, the temporary storage unit stores sound source data selected by the user at the moment and sound source data broadcast from the portion prior to the selected portion. In addition, the temporary storage unit stores the sound source data after the selected portion. Accordingly, the user can select a specific portion from the stored sound source data. The sound source data corresponding to the selected portion is output when a function that the user wants to perform is executed (S140). The functional sound may be an alarm, a ring tone, and an SMS alert sound. At this moment, the sound source data can be converted and stored in accordance with a functional sound output condition of the mobile phone. After completing setting the functional sound output condition, the functional sound is output when the corresponding function is executed in the mobile phone (S150).

Figure 4:
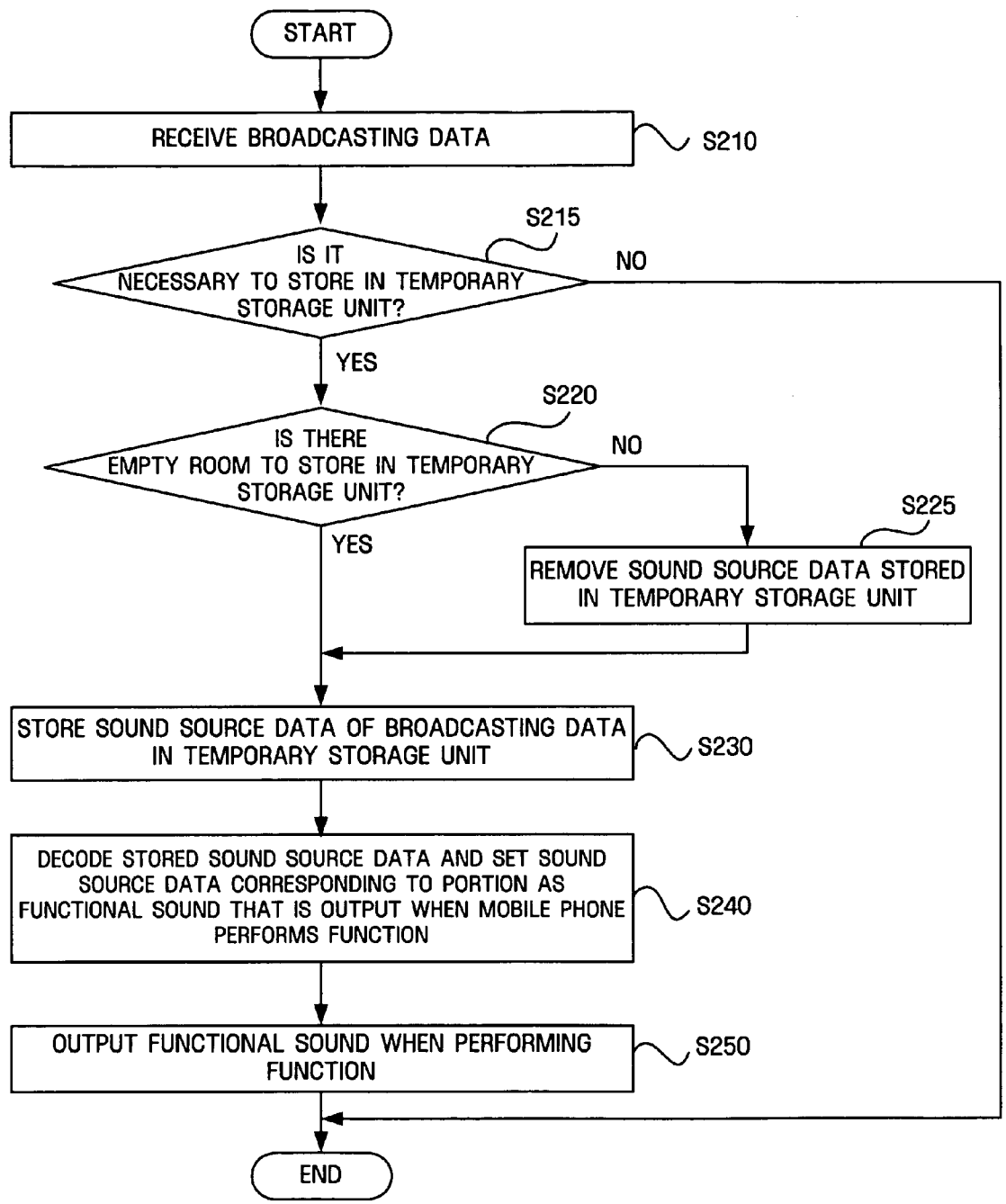
FIG. 4 is a flowchart showing processes of receiving and setting broadcasting data as a functional sound of a mobile phone according to another exemplary embodiment of the present invention.

FIG. 4 is a flowchart showing processes of receiving and setting the broadcasting data as a functional sound of the mobile phone according to another exemplary embodiment of the present invention. In FIG. 4, it is different from the processes shown in FIG. 3 in that the temporary storage unit stores encoded sound source data.

A broadcasting receiver that is mounted inside or outside the mobile phone receives the broadcasting data (S210).

Before storing the sound source data in a temporary storage unit, set information should be checked to determine whether or not it is necessary to store the broadcasting data in the temporary storage unit (S215). The determination may affect the performance of the mobile phone and power supply to buffer and maintain the broadcasting data received during a period of time. Therefore, the user can determine whether or not to buffer and maintain the broadcasting data received.

It is checked if the temporary storage unit has empty room to store the broadcasting data (S220). If the temporary storage unit does not have empty room to store the broadcasting data, sound source data stored beforehand is removed (S225). The sound source data to be removed can be selected according to various policies. The policies may be exemplified as an FIFO algorithm in which first stored data is first removed or another algorithm in which data having the lowest priority is removed when a user sets the priority with respect to the sound source data.

When the temporary storage unit has an empty room or acquires an empty room by removing other sound source data, the sound source data of the broadcasting data is stored in the temporary storage unit (S230). At this moment, the sound source data is extracted from the broadcasting data and stored in the temporary storage unit. When the sound source data is encoded by using, for example but not by way of limitation, Moving Pictures Experts Group (MPEG) standard, the sound source is stored in the temporary storage unit without any substantial change because the encoded sound source data can be stored in the temporary storage unit while obtaining small rooms. The temporary storage unit stores the sound source data during a period of time. When the user wants to set music or sound as a functional sound of the mobile phone while listening to the broadcasting, the user sets the corresponding music or sound as the functional sound (S240).

The temporary storage unit stores sound source data selected by the user at the moment and sound source data broadcast from the portion prior to the selected portion. In addition, the temporary storage unit stores the sound source data after the selected portion. Accordingly, the user can select a specific portion from the stored sound source data. The sound source data corresponding to the selected portion is output when a function that the user wants to perform is executed (S240). At this moment, the encoded data can be set as the functional sound after being decoded. The function sound includes an alarm, a ring tone, and an SMS alert sound. The functional sound may be an alarm, a ring tone, and an SMS alert sound. At this point, the sound source data can be converted and stored in accordance with a functional sound output condition of the mobile phone. After completing setting the functional sound output condition, the functional sound is output when the corresponding function is executed in the mobile phone (S250).

The terms "unit", "~module" or "table", as used herein, includes, but is not limited to, a software or hardware component, such as a Field Programmable Gate Array (FPGA) or Application Specific Integrated Circuit (ASIC), which performs certain tasks. A module may be configured to reside on the addressable storage medium and configured to execute on one or more processors.

Figure 5:
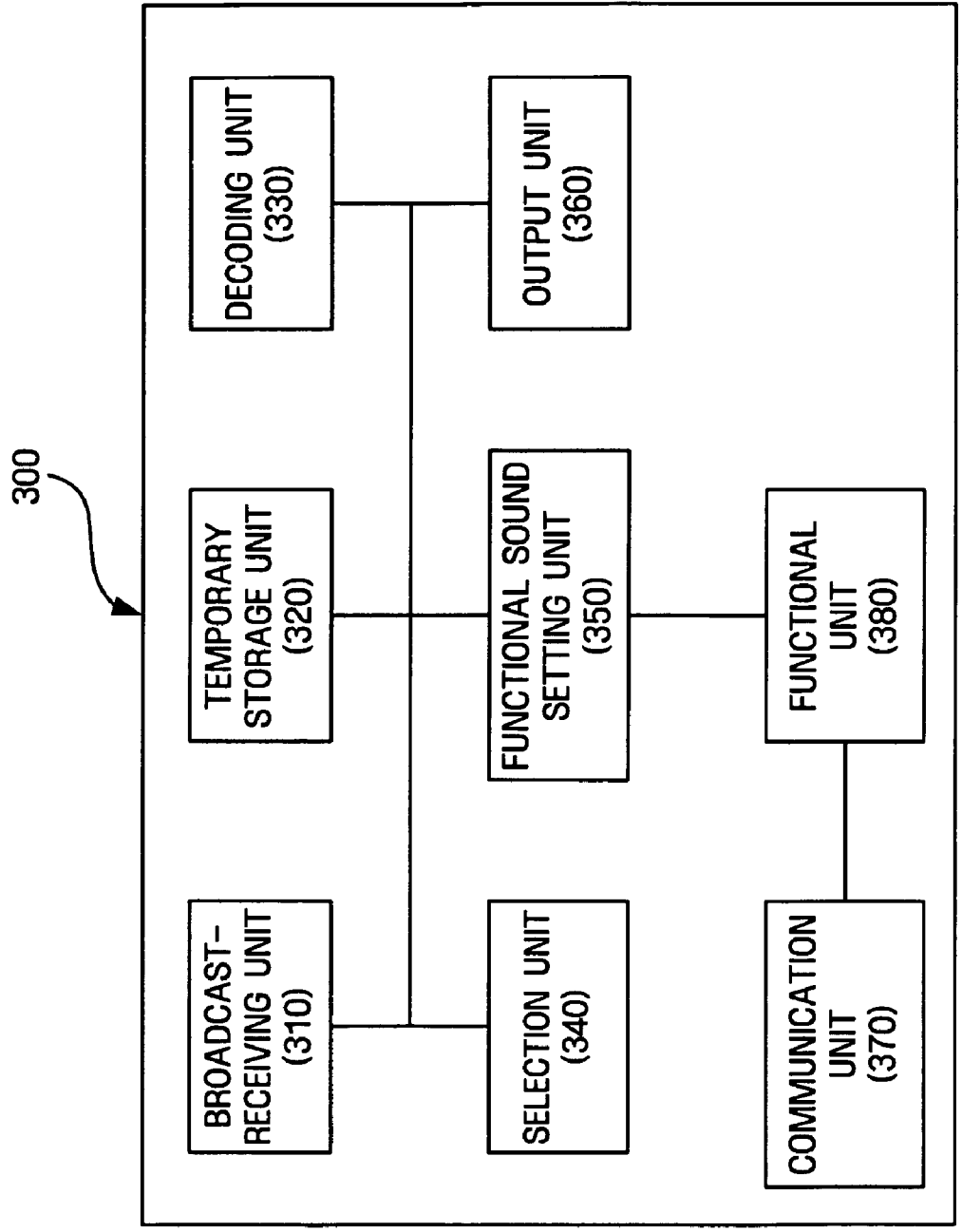
FIG. 5 is a block diagram showing a configuration of a mobile phone 300 according to the exemplary embodiment of the present invention.

FIG. 5 is a block diagram showing a configuration of a mobile phone 300 according to the exemplary embodiment of the present invention. The mobile phone includes a broadcasting-receiving unit 310 that receives DMB broadcasting, a temporary storage unit 320 that stores received sound source data, a decoding unit 330 that decodes the sound source data, a selection unit 340 that selects a specific portion of the stored sound source, a functional sound setting unit 350 that sets a functional sound, and an output unit 360 that outputs the functional sound. The mobile phone further includes a communication unit 370 that performs communication, which is a main function of the mobile phone, and a functional unit 380 that performs various functions for the mobile phone.

The broadcasting-receiving unit 310 receives DMB/DAB broadcasting data. The broadcasting data includes data of broadcasting information and sound source data. The temporary storage unit 320 may be a RAM or a flash memory and temporally stores the sound source data. The temporary storage unit 320 serves as a buffer and temporarily stores broadcasted sound source data so as to regenerate and use the sound source data later.

The decode unit 330 decodes the sound source data stored in the temporary storage unit 320 or the sound source data received through the broadcasting-receiving unit 310. When the sound source data is encoded and stored in the temporary storage unit 320, the decode unit 330 decodes and outputs the sound source data such that the user can select the desired sound source data. Further, when the sound source data is stored in the broadcasting-receiving unit 310, the sound source data can be decoded and stored in the temporary storage unit 320. According to the methods shown in FIGS. 3 and 4, the sound source data to be stored in the temporary storage unit 320 may be substantially different.

The selection unit 340 selects a specific portion from the sound source data. That is, the selection unit 340 repeatedly regenerates the sound source data stored in the temporary storage unit 320 or stops the sound source data at a point such that the user can select the desired portion. The user can designate a starting point and end point of the sound source data.

The functional sound setting unit 350 stores a functional sound and connection information in which a function is connected with sound source data to be output when the corresponding function is executed. The functional sound setting unit 350 can set whether to store the functional sound in the temporary storage unit 320. In addition, the functional sound setting unit 350 can determine a policy on which sound source data is to be first removed. For example, the functional sound setting unit 350 can determine whether to use the FIFO algorithm or to remove sound source data having the lowest priority. The output unit 360 outputs the sound source data or a functional sound. A speaker may be exemplified as the output unit 360, but is not limited thereto.

The communication unit 370 enables the mobile phone to perform communication through a wireless network and supports a voice call or data communication. The functional unit 380 performs a function of the mobile phone. The function includes overall functions necessary to use the mobile phone, such as an alarm function, an SMS function, or a function of ringing when the mobile phone receives a call. When a function is performed through the functional sound setting unit 350, the functional unit 380 informs the execution of the corresponding function to the functional sound setting unit 350 so as to output the functional sound.

Figure 6:
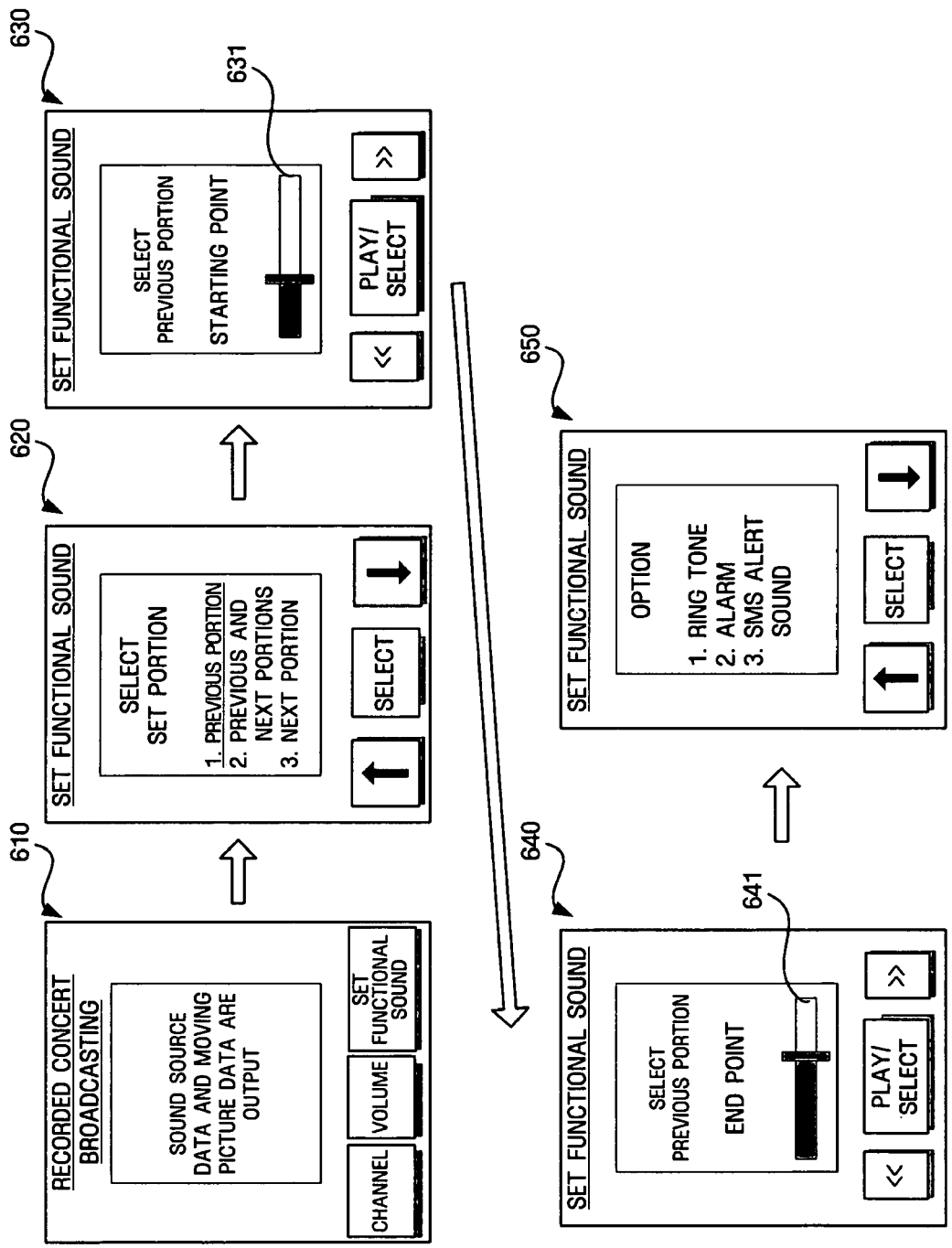
FIG. 6 is a view showing processes of setting DMB broadcasting data as a ring tone of a mobile phone according to another exemplary embodiment of the present invention.

FIG. 6 is a view showing processes of setting DMB broadcasting data as a ring tone of the mobile phone according to the exemplary embodiment of the present invention. Reference number 610 indicates a screen of the mobile phone in which recorded concert broadcasting is output. The user can control a broadcasting channel and volume by using a channel key and a volume key. FIG. 6 shows a case that a function of the key is changed according to the function of the mobile phone by using a soft key. When a user finds a portion to set as the functional sound while listening to the sound source data or wants to set the functional sound among the portions stored beforehand, the functional sound is set. As a result, the screen thereof changes to a screen 620.

The portion to be set as the functional sound is selected from the stored sound source data or sound source data currently received. The portion to be set may be one of next three cases: first, a portion selected from the stored sound source, that is, previous portion; second, a portion of currently broadcasting sound source, that is, the sound source output from the beginning to a point; and third, a portion of the sound source to be output from now.

If the previous portion is selected, the user should select a starting point and an end point of the stored sound source data. The mobile phone supplies a scroll bar 631 such that the user can visually understand which point of the sound source to be selected now from the stored sound source data. The user can select the desired point of the sound source data while listening to the stored sound source data by using a rewind (<<), fast forward (>>), or play/selection key.

As shown in a screen 640, the end point can be indicated by using a scroll bar 641. The user can select the desired point while listening to the stored sound source data by using a rewind (<<), fast forward (>>), or play/selection key. The user selects a specific portion from the sound source data, and determines which function is connected to the sound source data corresponding to the selected portion. As shown in a screen 650, options to be selected may be displayed such that the user can select a desired function.

Figure 7:
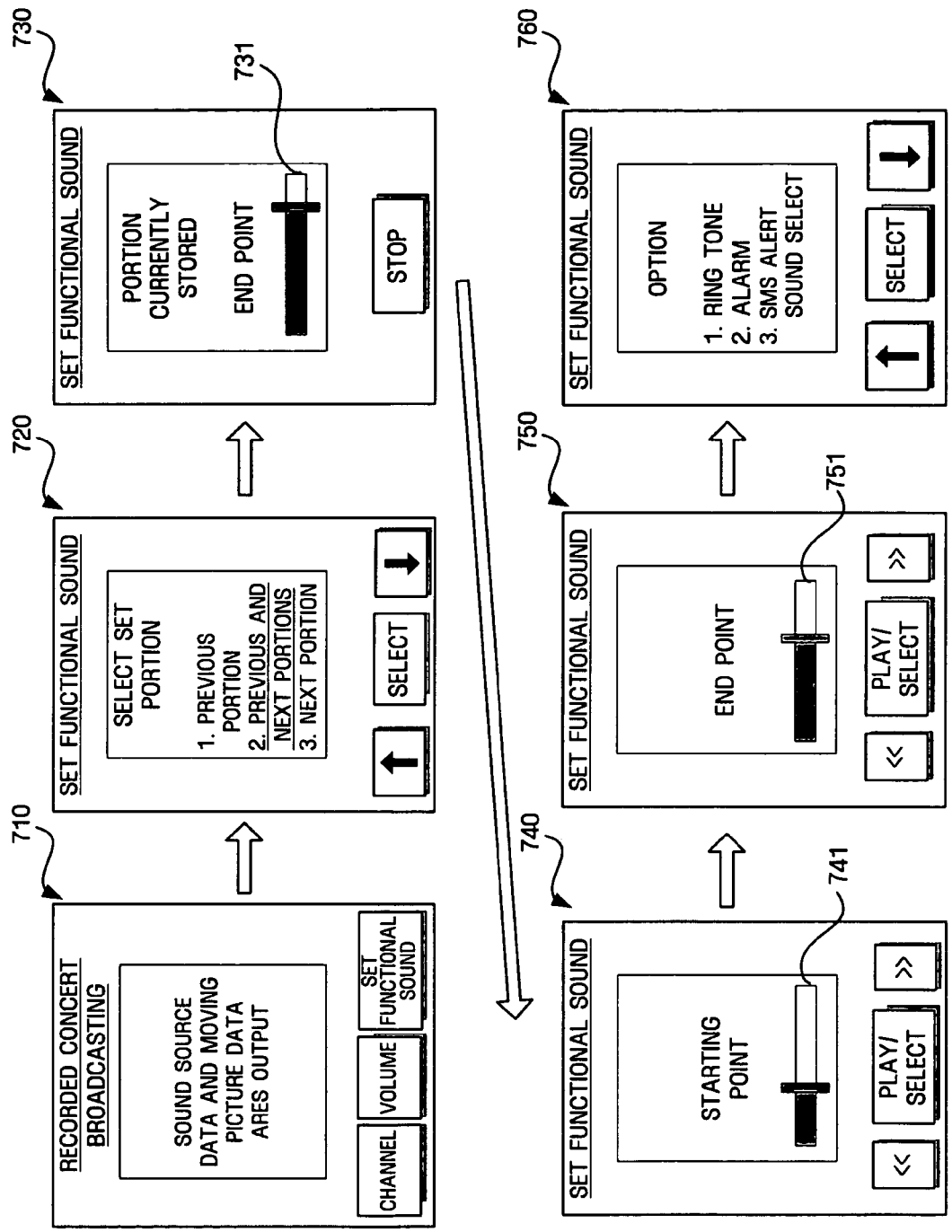
FIG. 7 is a view showing processes of setting DMB broadcasting data as a ring tone of a mobile phone according to another exemplary embodiment of the present invention.

FIG. 7 is a view showing processes of setting DMB broadcasting data as a ring tone of a mobile phone according to another exemplary embodiment of the present invention. Reference number 710 indicates a screen of the mobile phone in which recorded concert broadcasting is output. The user can control a broadcasting channel and volume by using a channel key and a volume key. When a user finds a portion to set as the functional sound while listening to the sound source data or wants to set the functional sound among the portions stored beforehand, the functional sound is set. As a result, the screen thereof changes to a screen 720.

The portion to be set as the functional sound is selected from the stored sound source data or sound source data currently received. The portion to be set may be one of following three cases: first, a portion selected from the stored sound source, that is, previous portion; second, a portion of currently broadcasting sound source, that is, the sound source output from the beginning to a point; and third, a portion of the sound source to be output from this point in time forward.

Unlike the case shown in FIG. 6, a case of selecting previous and next portions of the sound source data will be described in FIG. 7. The previous and next portions include the sound source data stored beforehand and sound source data to be listened. The user selects the point of the sound source data to stop to store while listening to the sound source data currently broadcasted. The user can select the desired point by pressing a stop key at a point where the desired music ends while the music is continuously output. The user can know how much sound source data is stored in the temporary storage unit by checking a scroll bar 731.

Since the user presses the stop key, the user can select the sound source data between the starting storage point and the ending storage point. As shown in a screen 740, the user can select the point started to store the sound source data from the stored region by using a rewind (<<), fast forward (>>), or play/selection key while listening to the stored sound source data. The user can visually understand the point that can be selected of the sound source data and can visually understand which portion of the sound source is played now by checking the variation of the scroll bar 741.

As the point started to store the sound source data, the user selects the point ended to store the sound source data as shown in a screen 750. When the user selects a specific portion of the sound source data, the user determines a function to be connected with the selected portion of the sound source. As shown in a screen 750, options to be selected may be displayed such that the user can select a desired function.

FIGS. 6 and 7 are exemplary embodiments showing processes of selecting the portion of the sound source data by using a play, rewind, or fast forward key while listening to the sound source data. In addition, the user can set data stored in the temporary storage unit to a functional sound while regenerating the sound source data after a period of time elapsed. Further, in order to reduce a process of selecting a portion, the user can select the portion of the sound source data by the unit of, for example, "before 10 seconds" or "before 20 seconds".

According to the exemplary embodiments, it is possible to set received broadcasting data to functional sound of a mobile phone.

According to the exemplary embodiments, it is possible to store a portion of sound source data so as to set a functional sound of a mobile phone by using the sound source data output beforehand.

Although the present invention has been described in connection with the exemplary embodiments, it will be apparent to those skilled in the art that various modifications and changes may be made thereto without departing from the scope and spirit of the invention. Therefore, it should be understood that the above embodiments are not limitative, but illustrative in all aspects.

What is claimed is:

1. A method of setting received broadcasting sound source data as a functional sound of a mobile phone, the method comprising:
   receiving and decoding broadcasting data;
   storing sound source data included in the decoded broadcasting data in a temporary storage unit;
   selecting a portion of the stored sound source data by selecting a start point and an end point of the sound source data by using a scroll bar;
   setting the portion of the stored sound source data selected by a user as a functional sound configured to be output if a function of the mobile phone is executed; and
   outputting the functional sound if the function is executed;
   wherein the setting the portion of the stored sound source data as the functional sound comprises:
   storing connection information on the set functional sound and the function; and
   storing the functional sound in a storage unit, and
   wherein the selecting the portion of the stored sound source data occurs before the setting the portion of the stored sound source data as the functional sound.

2. The method of claim 1, further comprising outputting the sound source data after the storing of the sound source data.

3. The method of claim 1, further comprising converting the sound source data in accordance with an output condition of the mobile phone and storing the converted sound source data as the functional sound of the mobile phone.

4. The method of claim 1, further comprising removing the sound source data stored in the temporary storage unit in accordance with a policy.

5. The method of claim 1, wherein the storing of the sound source data comprises:
   searching set information to store the sound source data; and
   storing the sound source data in accordance with a storage time calculated as a result of the searching and information on whether to store the sound source data.

6. A method of setting received broadcasting sound source data as a functional sound of a mobile phone, the method comprising:
   receiving broadcasting data;
   storing sound source data of the received broadcasting data in a temporary storage unit;
   decoding the stored sound source data;
   selecting a portion of the stored sound source data by selecting a start point and an end point of the sound source data by using a scroll bar;
   setting the portion of the decoded sound source data selected by a user as a functional sound configured to be output if a function of the mobile phone is executed; and
   outputting the functional sound if the function of the mobile phone is executed;
   wherein the setting the portion of the decoded sound source data as the functional sound comprises:
   storing connection information on the set functional sound and the function; and
   storing the functional sound in a temporary storage unit, and
   wherein the selecting the portion of the stored sound source data occurs before the setting the portion of the decoded sound source data as the functional sound.

7. The method of claim 6, further comprising decoding the sound source data after the storing of the sound source data.

8. The method of claim 6, further comprising decoding and converting the sound source data in accordance with an output condition of the mobile phone and storing the converted sound source data as the functional sound of the mobile phone.

9. The method of claim 6, further comprising removing the sound source data stored in the temporary storage unit in accordance with a policy.

10. The method of claim 6, wherein the storing of the sound source data comprises:
    searching set information to store the sound source data; and
    storing the sound source data in accordance with a storage time calculated as a result of the searching and information on whether to store the sound source data.

11. An apparatus for setting received broadcasting sound source data as a functional sound of a mobile phone, the apparatus comprising:
    a broadcast-receiving unit which receives broadcasting data;
    a temporary storage unit which stores sound source data of the received broadcasting data;
    a selection unit through which a user selects a portion of the stored sound source data by selecting a start point and an end point of the sound source data by using a scroll bar;
    a functional sound setting unit which sets the selected portion of the sound source data as a functional sound configured to be output if a function of the mobile phone is executed; and
    an output unit which outputs the functional sound if the function of the mobile phone is executed;
    wherein the functional sound setting unit stores connection information on the set functional sound and the corresponding function in a storage unit, and
    wherein the selecting the portion of the stored sound source data occurs before the setting the portion of the stored sound source data as the functional sound.

12. The apparatus of claim 11, further comprising a decoding unit which decodes the received broadcasting data, wherein the temporary storage unit stores the sound source data decoded by the decode unit.

13. The apparatus of claim 11, wherein the output unit sets the received broadcasting sound source data, which is converted and stored in accordance with an output condition of the mobile phone, as the functional sound.

14. The apparatus of claim 11, wherein the temporary storage unit removes the stored sound source data according to a policy.

15. The apparatus of claim 11, wherein the temporary storage unit searches set information necessary to store the sound source data, and stores the sound source data in accordance with a storage time calculated as a result of the search and information on whether to store the sound source data.

16. A non-transitory computer-readable medium configured to store a set of instructions performing a method of setting received broadcasting sound source data as a functional sound of a mobile phone, the method comprising:
    receiving and decoding broadcasting data; storing sound source data included in the decoded broadcasting data in a temporary storage unit;
    selecting a portion of the stored sound source data by selecting a start point and an end point of the sound source data by using a scroll bar;

setting the portion of the stored sound source data selected by a user as a functional sound configured to be output if a function of the mobile phone is executed; and outputting the functional sound if the function is executed;

wherein the setting the portion of the decoded sound source data as the functional sound comprises:

storing connection information on the set functional sound and the function; and storing the functional sound in a temporary storage unit, and wherein the selecting the portion of the stored sound source data occurs before the setting the portion of the decoded sound source data as the functional sound.

* * * * *